United States Patent [19]

Siegel

[11] 4,036,017

[45] July 19, 1977

[54] LOW PRESSURE ENGINE

[76] Inventor: Israel Siegel, 351 W. 71st St., New York, N.Y. 10023

[21] Appl. No.: 650,444

[22] Filed: Jan. 19, 1976

[51] Int. Cl.² .............................................. F03C 1/00
[52] U.S. Cl. ........................................ 60/497; 60/641; 60/531
[58] Field of Search ................ 60/495, 497, 502, 531, 60/516, 641

[56] References Cited

U.S. PATENT DOCUMENTS 3,841,097  10/1974  Siegel ...................................... 60/517

*Primary Examiner*—Allen M. Ostrager

[57] ABSTRACT

The low pressure engine operates through a temperature and pressure differential between two chambers containing a low boiling point liquid. The pressure differential causes the liquid to rise in a relatively small interspace between a conduit and a float in the relatively warm chamber. In order to obtain a mechanical advantage the float is temporarily restricted from responding to the buoyant force exerted by the liquid until the liquid in the interspace has reached a predetermined level.

2 Claims, 5 Drawing Figures

LOW PRESSURE ENGINE

SUMMARY

The invention describes an engine designed to operate efficiently at very low pressures and temperatures. It operates through relatively small temperature differential between two interconnected sealed chambers containing a low boiling point fluid, and through a float designed to obtain a mechanical advantage from the buoyant force of a small body of a rising liquid. The chambers are interconnected through two conduits. One conduit is immersed at one open end in the low boiling point fluid of the relatively warm chamber. The conduit is connected through its other open end with the relatively cold chamber. A float is present inside the section of the conduit in the warm chamber, and defines a relatively small interspace between the walls of the conduit and float. The temperature differential between the chambers results in a corresponding pressure differential between the two ends of the conduit and causes the rise of the liquid in the interspace. The liquid exerts a buoyant force upon the float which is restricted from movement until fluid has reached a predetermined level in the interspace. The second conduit connects the vapor phases of the cold and warm chambers. By means of synchronized opening and closing of this vapor communication, a cyclic movement of the float is obtained. In one form of the invention mercury rises in the interspace in response to vapor pressure, in order to increase the buoyant force exerted upon the float. The reciprocal up and down movement of the float is translated to useful work through conventional linkages to force receiving means. Condensed vapor accumulates in the cold chamber and is returned to the warm chamber by force of gravity or by a pump.

BACKGROUND AND OBJECTIVES

The invention relates to an engine which can operate efficiently at extremely low pressures and temperatures, and in particular to differential temperature fluid engines described by the author in U.S. Pat. No. 3,841,097 (application Ser. No. 334,974 filed Feb. 22, 1973). The need for a low pressure engine has been created by the high prices and diminishing reserves of fossil fuels, and the search for an engine which can operate efficiently through solar energy. While solar energy is practically unlimited, it reaches the earth in a relatively diffuse form and relatively low temperatures. Most existing engines which have been designed to utilize fossil fuels, operate most efficiently at relatively high temperatures and pressures. The efficiency of the fuel engines, however, drops at low pressures and low temperatures to a level which renders the operation of the fossil engines highly impractical. This is due, in part to the low Carnot efficiency of the engines, and in part to relatively large energy losses inherent in the operation of relatively small and slow engines. Because of Carnot's limitation in the maximal amount of available mechanical energy in low pressure engine, it becomes particularly important to reduce the operational energy losses. The present disclosure describes an engine which can operate at low pressures and temperature with almost complete utilization of its Carnot's available energy.

The invention is based, in part, upon a modification of Archimedes principle. The principle, in its original form, states that the buoyant force acting upon a body submerged in a fluid is equal to the weight of the body of fluid displaced by the body. I have recently constructed a model to show that Archimedes principle does not apply to a body submerged in a confined body of water when the submerged body raises significantly the level of the fluid. Under these conditions the buoyant force is equal not to the weight of the liquid displaced by the body but to the weight of the liquid which can fill the volume of the body submerged in the fluid. Thus, when a relatively large body is submerged, in a confined volume, by a relatively small volume of fluid the buoyant force exerted by the liquid may greatly exceed the weight of the submerging fluid (a numerical example is given at the end of the detailed description of the engine). One of the main objectives of the present disclosure is to utilize this modification of Archimedes principle to obtain a mechanical advantage from a small body of rising fluid during the operation of a temperature differential engine.

An additional objective of the present invention is to increase the compactness of such an engine by the utilization of high density buoyant fluid, e.g. mercury.

Additional improvements and objectives will become apparent during the ensuing detailed description.

In all the figures similar parts have been given similar numbers.

DETAILED DESCRIPTION

Figure 1:
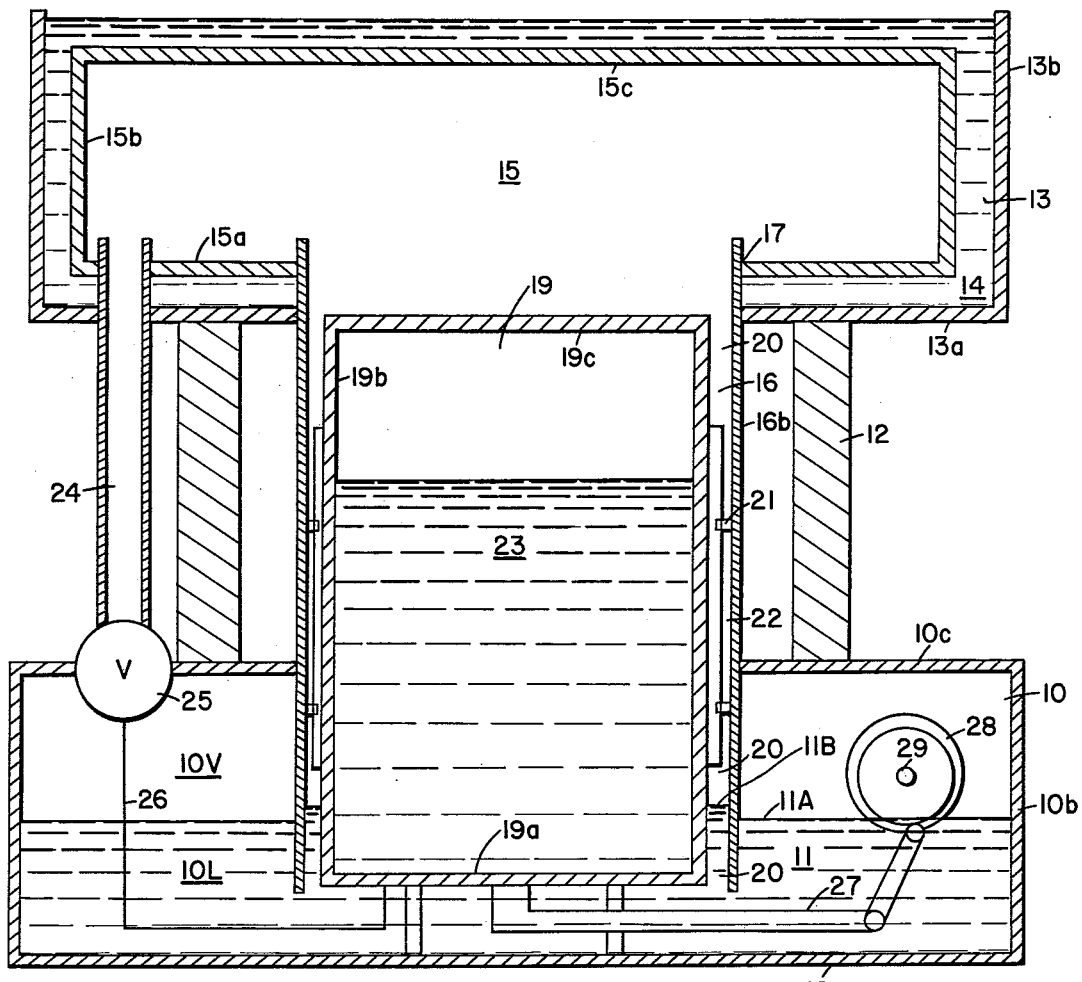
FIG. 1 is a cross-sectional view of a low pressure engine embodying the present invention.

Referring to FIG. 1 there is shown a differential temperature motor which embodies the principles of the present invention. Situated at the lower part of the engine is a chamber 10. The chamber 10 serves as the relatively warm chamber and evaporator, as will be hereinafter described. In the illustrated form of the invention the evaporator Chamber 10 is defined as a rectangular chamber having bottom wall 10a, side wall 10b, and upper wall 10c. Chamber 10 contains a liquid preferably a low boiling point liquid 11, wherein the liquid supply 11 defines a liquid level 11A, a liquid chamber portion 10L, and a vapor chamber portion 10V.

Situated on top of container 10, and suitably supported on supports 12 is a tray 13 which is adapted to hold water 14 at a shallow level. The tray is defined by side walls 13b and bottom wall 13a. The level of water 14 in tray 13 is adjusted so that the temperature of the water will be naturally cooler than air temperature due to natural evaporation from its surfaces. Suitably immersed in water 14 is a container 15 which serves as a condensor chamber as will be hereinafter described. In the illustrated form of the invention the condensor chamber 15 is a rectangular chamber defined by bottom wall 15a, sidewalls 15b, and top wall 15c. Chambers 10 and 15 are interconnected by conduit 16. As can be seen in FIG. 1 conduit 16 penetrates top wall 10c of evaporator chamber 10, bottom wall 13a of tray 13, and bottom wall 15a of condensor chamber 15. The arrangement is such that conduit 16 forms a tight fit with all the penetrated walls to prevent leakage. Sealant 17 may be added to the borders between tube 16 and the penetrated walls to hermetically seal condenser 5 and evaporator 10 from the outside environment and to prevent leakage of water 14 from tray 13. As can be seen in FIG. 1, conduit 16 extends into liquid chamber portion 10L of evaporator chamber 10 so that its lower open end is immersed in liquid 11. The conduit 16 extends only relatively slightly into condensor chamber 15.

Disposed within tube 16 and supported on supports 18 is a float 19. The float 19 is defined by bottom wall 19a, side walls 19b, and top wall 19c. The float 19 is sized and shaped so as to have the wall portions 19b of float 19 spaced only sightly from side walls 16b of conduit 16. The arrangement is such that the volume of the interspace 20 between side walls 19b and 16b defines a volume which is very much smaller than the volume of float 19 as will be hereinafter described. The body or float 19 is disposed within tube 16 so as to allow for a relative movement therebetween. Suitable guide means are provided for maintaining the position of the float 19 relative to the conduit 16 during such relative movement. The guide means may comprise guide rings 21 which may be connected to the internal sidewalls of conduit 16 to ride along guide members 22 or rods connected to the side walls 19b of float 19.

Weights 23 are present inside body 19 to cause a predetermined resistance to buoyant forces acting upon body 19. The weights may be composed of inert material such as water, sand, or mercury. The predetermined resistance to the upward movement of the float in response to buoyant forces is essential for the development of the buoyant force as will be illustrated.

The vapor portion of 10V of evaporator chamber 10 and inside of condensor chamber 15 are connected by a vapor conduit 24. Controlling the flow of vapor through conduit 24 is a valve 25 which is normally closed. In accordance with this invention, the vapor valve 25 is periodically actuated between an open and closed position automatically and in response to the movement of the float 19 as will be herein described. A valve actuator 26 is interconnected between the low wall 19a of float 19 and the valve 25. The arrangement is such that the upper movement of float 19 will effect an opening of valve 25, and downward movement of float 19 will effect a closing of valve 25.

Connected to the lower wall 19a of float 19 are force transmitting means. In the illustrated form of the invention these consist of a connecting rod 27, a crank 28, and a shaft 29. The up and down movement of float 19 is thus translated to rotary movement of the shaft 29. The shaft may be connected by conventional linkages (not shown) to work producing means such as a generator, or wheels for vehicle movement. In the illustrated form of the invention the force transmitting members 27-29 have been placed inside the warm chamber, so that any heat caused by friction would not be lost but would contribute to the heat content of the evaporator. Changes in the placement of the force transmitting members may however be made without affecting the essential function of the engine.

The operation of the low pressure engine illustrated in FIG. 1 is as follows. Natural evaporation of water 14 in tray 13 cools water 14 and submerged condenser chamber 15 to below air temperature. In contrast, evaporator chamber 10 is kept relatively warm by ambient air. This creates a temperature differential between condensor chamber 15 and evaporator chamber 10. Vapor is generated in evaporator chamber 10 by evaporation of low boiling point fluid 11 in chamber 10. This vapor exerts a vapor pressure upon walls of chamber 10 and upon liquid surface level 11A. Vapor in condensor chamber 15, generated by the evaporation of liquid 11 in interspace 20, exerts a pressure upon walls of condensor 15 and upon liquid surface level 11B in interspace 20. With valve 25 closed the vapor in evaporator chamber 10 is separated from the vapor in condensor chamber 15. The temperature difference between evaporator chamber 10 and condensor chamber 15 causes a corresponding vapor pressure difference between the chambers i.e. the vapor pressure in evaporator chamber 10 is higher than the vapor pressure in condensor chamber 15. Thus the vapor pressure upon liquid surface 11A in chamber 10 is larger than the vapor pressure upon liquid surface 11B in interspace 20. This will cause the liquid level to rise in interspace 20 above the level of the liquid in evaporator chamber 10. As this occurs the float 19 will be subject to a buoyant force causing it to rise. However, due to the biasing action of weights 23 in float 19, the float 19 is prevented from rising until the level of liquid in the interspace 20 is reached to provide the necessary buoyant force to overcome the bias of weights 23. When liquid in interspace 20 has reached a predetermined level the float 19 will rise. On rising, and as the float 19 approaches its upper limit of travel, the valve actuator 26 will open valve 25 causing the vapor chamber portion 10V of chamber 10 to be placed in communication with the vapors of chamber 15. When this occurs, an equalization of vapor pressures within the two chambers 10 and 15 is achieved. The differential pressures upon liquid surfaces 11A and 11B which has caused liquid to rise in interspace 20, will thus be absent. This will cuase the liquid level in interspace 20 to drop to its low starting level. The buoyant force which has lifted float 19 is thereby removed and float 19 will move downward through the force of gravity. As float 19 moves downward and approaches its lower limit of travel it causes valve actuator 26 to close valve 25. Upon closing of the valve 26 the vapor generated in evaporator 10 will again cause a pressure differential between chambers 10 and 15 to thus repeat the cycle of operation. In a complete cycle of operation the up and down movement of the float 19 will effect corresponding movements of the force transmission members 27, 28 and 29. The rotary movements of the shaft 29 is readily translated through appropriate linkages to useful work. The vapor which has entered condenser 15 from evaporator chamber 10 during the opening of valve 25 condenses to form liquid due to the relatively cold temperature in condensor 15. The liquid is returned to evaporator chamber 10 by force of gravity either through interspace 20 or through conduit 24 during opening of valve 25.

It is understood that a temperature differential between the evaporator and condensor chambers may be obtained by a variety of means without departing from the essential features of the invention. This includes selective wetting of surfaces of condensor chamber 15 and cooling by natural evaporation of water from the surfaces of the condensor chamber. This evaporation may be augmented by means for increasing air circulation around the surfaces of the condensor such as auxiliary fans. The warm chamber can be warmed by selective exposure to direct solar radiation. The absorption of solar energy by the warm chamber may be augmented by dark colors of the surfaces of the warm chamber and/or transparent housings enclosing the warm chamber. A differential temperature may likewise be obtained by non-natural means. Thus, under certain conditions it may be desirable to heat the evaporator chamber by fossil fuels, or cool the condensor chamber by immersion in an ice bath.

Figure 2:
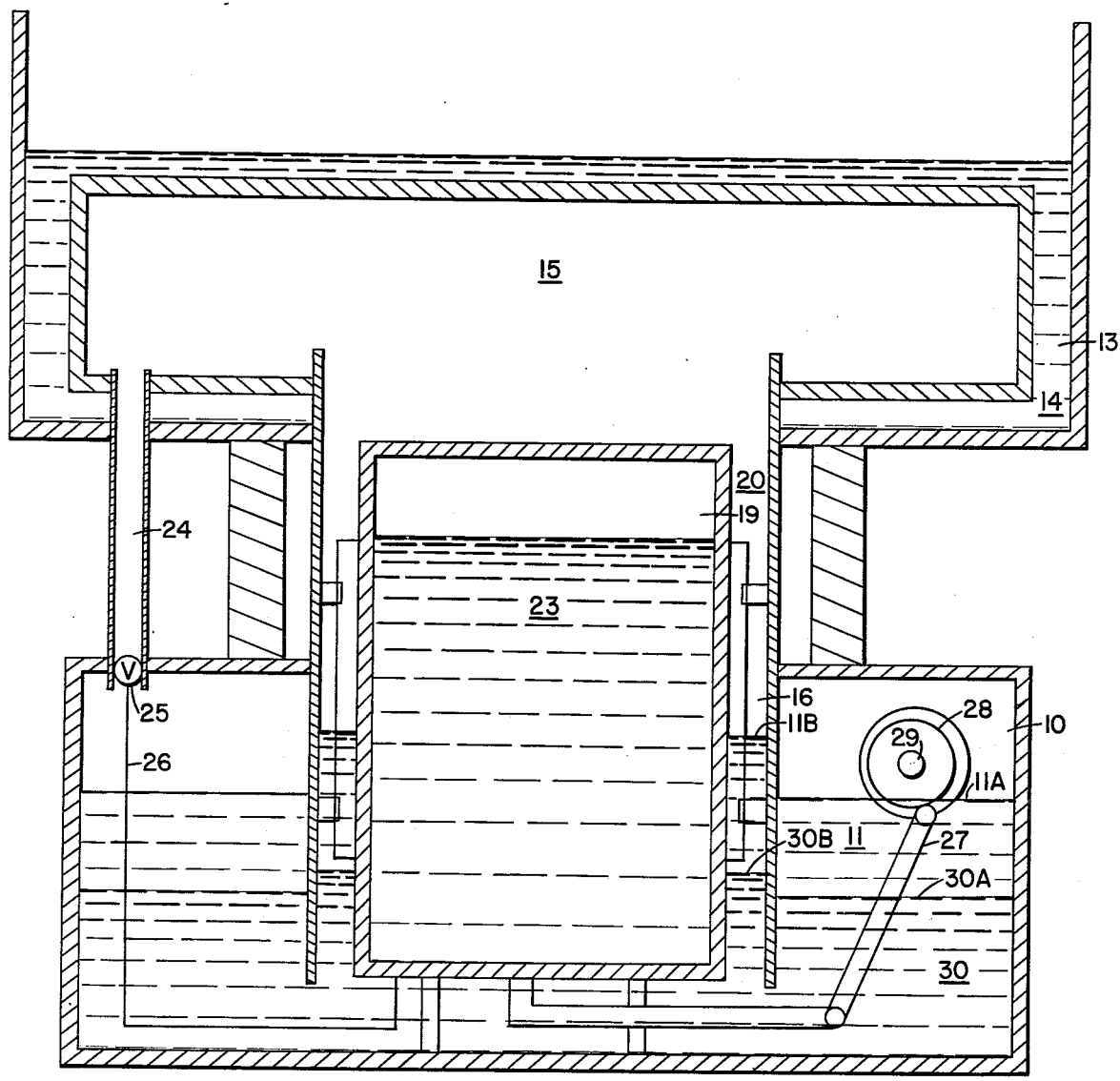
FIG. 2 is a cross-sectional view of a modified form of the invention.

FIG. 2 illustrates a modified form of the invention. In this form of the invention the construction of the low pressure engine is similar to that described in FIG. 1, except that evaporator chamber 10 contains a layer of mercury 30, in addition to the low boiling point liquid 11. Because of its relatively high specific weight the mercury will form the bottom layer of liquid in evaporator chamber 10. Thus, container 10 will contain 2 liquid layers consisting of a bottom mercury layer defining a mercury liquid level 30A, and an upper low boiling point fluid layer 11 defining liquid level 11A. The arrangement is that the open lower end of tube 16 extends into the mercury level 30A and thus dips in the mercury 30 instead of the low boiling point fluid 11. The mercury 30 thus enters interspace 20 forming an interspace mercury level 30B. On top of the mercury level 30B in interspace 20 there is present a layer of low boiling point fluid 11 defining a low boiling liquid level 11B. All other parts of the invention illustrated in FIG. 2 are similar to those described in FIG. 1 and have been given similar numbers.

The operation of the low pressure motor illustrated in FIG. 2 is as follows. Natural evaporation of water 14 in tray 13 cools water 14 and immersed condensor chamber 15 to below air temperature. In contrast, evaporator chamber 10 is warmed by relatively warm ambient air. This creates a temprature differential between condensor chamber 15 and evaporator chamber 10. Vapor is generated in evaporator chamber 10 by evaporation of low boiling point fluid 11. This vapor exerts a vapor pressure upon walls of chamber 10 and upon liquid surface level 11A. Low boiling point fluid 11 in interspace 20 and condensor 15 likewise exert a vapor pressure upon walls of condensor 15 and upon liquid surface level 11B in interspace 20. With valve 25 closed the vapor in evaporator chamber 10 is separated from the vapor in condensor chamber 15. The temperature differance between evaporator chamber 10 and condenser chamber 15 causes a corresponding vapor pressure difference between the chambers i.e. the vapor pressure in evaporator chamber 10 is higher than vapor pressure in condensor chamber 15. Thus the vapor pressure upon liquid surface 11A in chamber 10 is larger than the vapor pressure upon liquid surface 11B in interspace 20. The pressures upon low boiling point fluid surfaces 11A and 11B are transmitted respectively to mercury liquid surfaces 30A and 30B. Since vapor pressure transmitted to mercury surface 30A is higher than pressure transmitted to mercury surface 30B the mercury will rise in interspace 20 and will exert a buoyant force upon float 19. Because of the relative high density of the mercury layer the buoyant force exerted upon float 19 will be much larger than that developed through the rise of the low boiling point fluid 11. The weights 23 in float 19 are adjusted to prevent the float from rising until the mercury has risen to a predetermined level in interspace 20. When the mercury rises to the desired level in interspace 20 to develop a buoyant force to overcome the resistance exerted by weights 23 the mercury will lift float 19. When float 19 has reached its upper limit of travel it opens valve 25 through the action of valve actuator 26. This allows vapor to travel from chamber 10 to chamber 15 and equalizes the pressures exerted on the mercury in evaporator container 10 and condensor 15. This will cause the mercury to flow back to its original low level and will remove the buoyant force acting upon float 19. The float 19 will then return to its original low level. When float 19 has reached its lower limit of travel it causes valve actuator 26 to close valve 25. This separates the vapor phases of chambers 10 and 15 and renews the cycle of operation.

The vapor which has entered condensor 15 from evaporator 10 during the opening of valve 25 condenses back to its liquid form, because of the relatively low temperature in condensor 15. The liquid accumulates in interspace 20 and lower portion of chamber 15. When interspace 20 is filled the liquid condensate overflows into the lower portion of condensor chamber 15. The liquid present in the lower portion of the condensor chamber 15 is returned to evaporator chamber by force of gravity through pipe 24 during the opening of valve 25. The cyclic up and down movement of float 19 is translated to useful work through force receiving member 27, 28 and 29 present in evaporator chamber 10.

Figure 3:
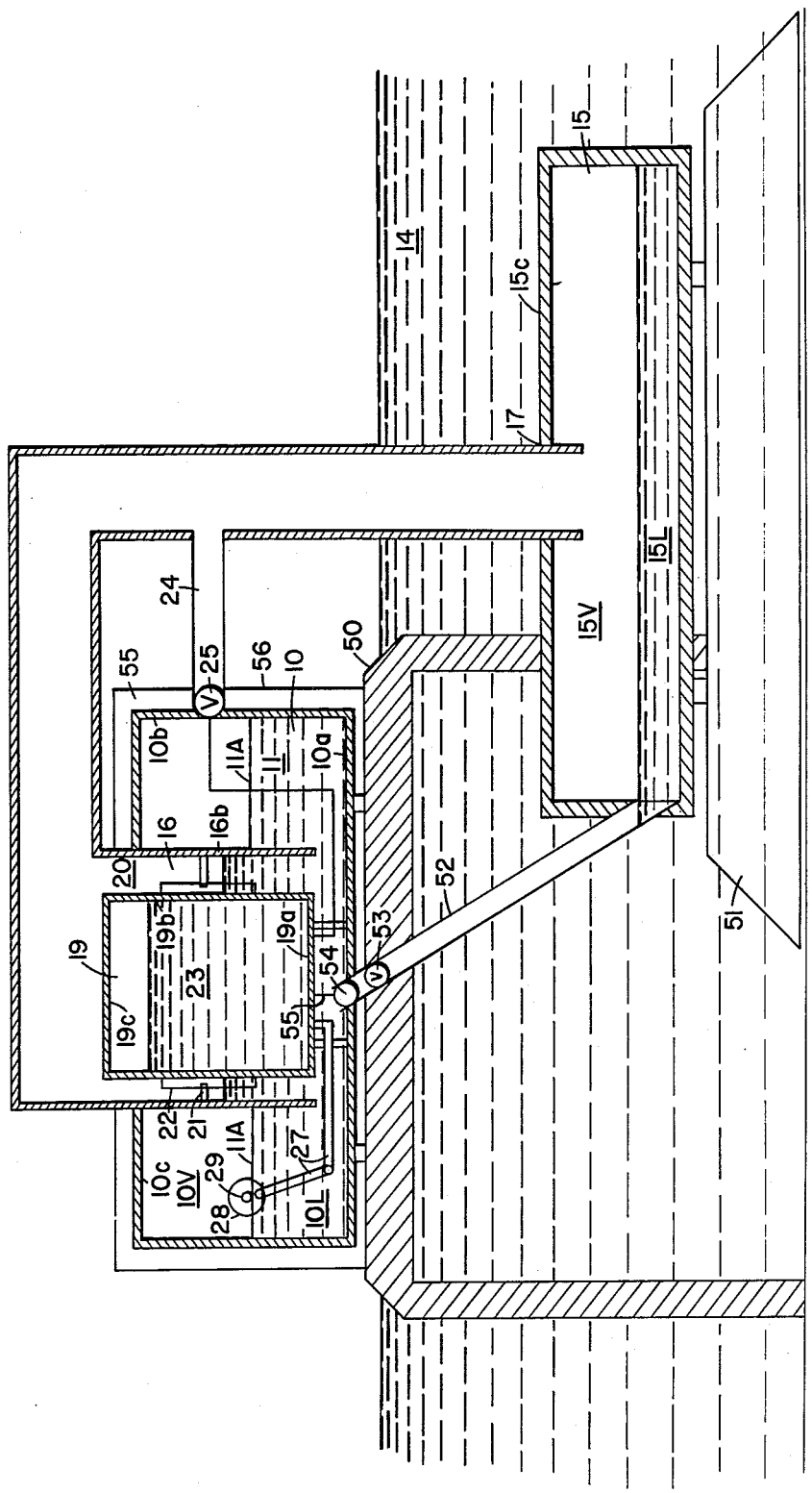
FIG. 3 is a cross-sectional view of another modified form of the invention.

FIG 3 illustrates another form of the invention adapted to operate by a temperature differential occurring between an ambient atmosphere and ambient water environment wherein the temperature of the ambient water is colder than that of the ambient atmosphere. The embodiment illustrated in FIG. 3 is particularly adopted for use under conditions in which the low pressure engine is used in proximity to a large body of water as for example, a lake or a sea. This version can be utilized for generation of electric power on stationary platforms or on boat traveling through such body of water. The engine illustrated in FIG. 3 is similar to the form described in FIG. 1 and similar components have received similar members, except that in FIG. 3 the cold chamber 15 is adapted to be immersed in a body of water 14 which is at a lower level than warm chamber 10. Thus, in the illustrated form of the invention a frame 50 is provided for supporting thereon a warm evaporator chamber 10. The evaporator chamber 10 is defined as a rectangular chamber having bottom wall 10a, side walls 10b, and upper wall 10c. Chamber 10 contains a low boiling point liquid 11, wherein the liquid supply 11 defines a liquid level 11a, a liquid chamber portion 10L, and a vapor chamber portion 10V.

Suitably supported on base 51 and immersed in body of water 14 is a container 15 which serves a condenser as will be hereinafter described. Tube or conduit 16 interconnects chambers 10 and 15. As can be seen in FIG. 3 condensor 15 is placed at a lower level than evaporator 10. Conduit 16 is curved and penetrates top walls 10C and 15C of chambers 10 and 15, respectively. The arrangement is such that conduit 16 forms a tight fit with the penetrated walls to prevent leakage. Sealant 17 may be added to hermetically seal the penetrated borders. As can be seen in FIG. 3, the open end of conduit 16 extends into liquid chamber portion 10L of evaporator chamber 10 and is immersed in liquid 11. Conduit 16 extends to just below the surface 15C of condensor chamber 15.

Disposed within conduit 16 and supported on supports 18 is a float 19. The float 19 is defined by bottom wall 19a, side walls 19b, and top wall 19c. The float 19 is sized and shaped so to have the wall portions 19b of float 19 spaced only sightly from side walls 16b of conduit 16. The arrangement is such that the volume of the interspace 20 between side walls 19b and 16b defines a volume which is very much smaller than the volume of float 19. The body or float 19 is disposed within conduit 16 so as to allow for a relative movement therebetween. Suitable guide means are provided for maintaining the position of the float 19 relative to the conduit 16 during such relative movement. The guide means may comprise guide rings 21 which may be connected to the internal sidewalls of conduit 16 to ride along guide members 22 or rods connected to the side walls 19b of float 19.

Weights 23 are present inside body 19 to cause a predetermined resistance to buoyant forces acting upon body 19. The weights may be composed of an inert material such as water, sand, or mercury.

The vapor portion of 10V evaportor chamber 10 and condensor chamber 15 are connected by a vapor conduit 24. Controlling the flow of vapor through conduit 24 is a valve 25 which is normally closed. In accordance with this invention, the vapor valve 25 is periodically actuated between an open and closed position automatically and in response to the movement of the float 19 as will be herein described. A valve actuator 26 is interconnected between the bottom wall 19a of float 19 and the valve 25. The arrangement is such that upper movement of float 19 will effect an opening of valve 25, and downward movement of float 19 will effect a closing of valve 25.

Connected to the bottom wall 19a of float 19 are force transmitting means. In the illustrated form of the invention these consist of a connecting rod 27, a crank 28, and a shaft 29. The up and down movement of float 19 is thus translated to rotary movement of the shaft 29. The shaft may be connected by conventional linkages (not shown) to useful work producing means such as a generator, for the production of electricity, or wheels for vehicle movement.

Connecting the liquid chamber portion 10L of evaporator 10 to the liquid chamber portion 15L of chamber 15 is a connecting pipe 52. A valve means 53 is interposed in conduit 52 to regulate the flow of liquid between the chambers 10 and 15. The valve 53 is so constructed that it allows for only one way movement of the fluid, i.e. the liquid 11 is free to move from the liquid chamber portion 15L of condensor 15 to the liquid chamber portion 10L of evaporator 10. A pump 54 is connected to pipe 52 to pump the condensate in liquid portion chamber 15L of condensor 15 to the liquid portion 10L of evaporator 10. If desired the pump may be actuated by movement of pump actuator 55 through a suitable interconnecting linkage means with float 19.

Present on top of base 50 is a transparent enclosure 55. The enclosure 55 is made out of transparent glass or plastic or any other material which admits solar radiation. The enclosure 55 contains movable wall portion 56 adapted to open and close enclosure 55. Present inside transparent enclosure 55 is the warm chamber 10. The arrangement is such that on days when direct solar radiation is available movable walls 56 close enclosure 55 and solar radiation increases the temperature of the inside of the enclosure 55 and chamber 10. At night and on days when direct solar radiation is not available moveable walls 56 open enclosure 55, and allow chamber 10 to be warmed by ambient air. Thus, a temperature differential required for the operation of the low pressure engine may be available both during the presence and absence of direct solar radiation.

Surface of members inside of enclosure 55 e.g. chamber 10 and floor 50 may be painted black in order to increase the absorbance of solar energy inside enclosure 55.

The operation of the engine described in FIG. 3 is similar to that described in FIG. 1 except that a temperature differential is obtained by the exposure of evaporator chamber 10 to relatively warm ambient air or/and direct solar radiation. Condensor chamber 15 is kept cooler than ambient air by immersion in a relatively cold body of water. An additional change is the fact that liquid condensate returns from condensor chamber 15 to evaporator chamber 10 through conduit 52 and valve 53 not through force of gravity but through the action of pump 54. Pump 54 is activated by pump activator 55 through movement of float 19

It is understood that the low pressure engine described in FIG. 3 may operate effectively under favorable climates without the transparent enclosure 55 through the remaining main structure of the invention. It is likewise understood that on days in which the temperature of the ambient water is warmer than the ambient air the positions of the warm and cold may be reversed, e.g. the warm chamber will be immersed in the relatively low warm body of water and the cold chamber will be exposed to cold ambient air.

Figure 4:
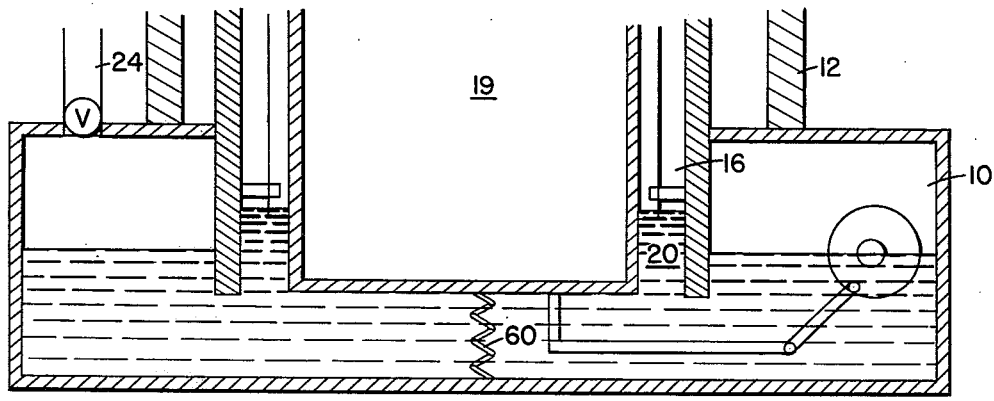
FIG. 4 is a cross sectional view of a modified form of the warm chamber section of the low pressure engine.

FIG. 4 illustrates another form of the invention. It is similar to FIG. 1 except that the means for obtaining resistance to upper movement of float 19 has been changed. Thus, weights 23 are omitted and resistance to upper movement of float 19 is provided by extension spring 60. The bias of extension spring 60 is such that it normally keeps float 19 at its lowest position. The resistance of spring 60 is regulated to prevent float 19 from rising until liquid in interspace 20 has reached a predetermined level. Thus, when liquid in interspace 20 has reached the desired level, it overcomes the resistance of spring 60 and raises float 19. The energy expended to move float 19 upward against resistance of spring 60 is recovered during the downward movement of float 19 and rebound of spring 60.

Figure 5:
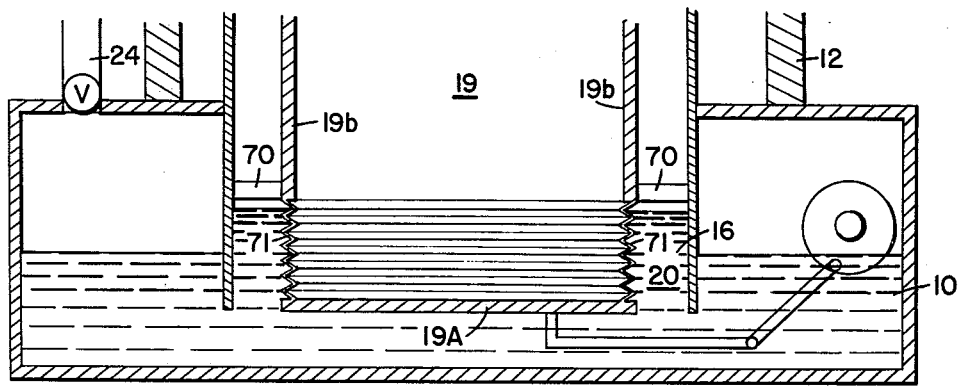
FIG. 5 is a cross sectional view of another modified form of the warm chamber section of the low pressure engine.

FIG 5 illustrates another form of the invention. It is similar to FIG. 1 except that float 19 is immovably attached to conduit 16 through bars 70. Lower wall 19A of float 19 is movably attached to side walls 19b of float 19 by flexible compression means, e.g. a bellows construction 71 whereby the inherent resiliency of the bellows construction functions as a compression spring. The arrangement is such that bellows 71 normally exerts a bias of a predetermined spring force to keep bottom wall 19a away from side wall 19b. When the liquid level rises in interspace 20 a buoyant force is exerted on bottom wall 19a. When the buoyant force overcomes resistance of spring bellows 71, bottom wall 19A will rise in response to buoyant force. When the liquid leaves interspace 20 the energy expended for lifting bottom wall 19 against resistance of spring 71 is recovered during the downward movement of bottom wall 19a.

While this invention has been described with reference to particular embodiments thereof it will be readily appreciated and understood that variations and modifications of the invention may be made without departing from the spirit or scope thereof.

The following will provide a numerical example of the mechanical advantage that can be obtained by the operation described. It is understood that the dimensions cited may be varied to suit the specific needs of the users, and the numerical example herein given is for illustrative purposes only.

The volume of the interspace 20 between the walls of tube 16 and float 19 is equal to the volume of tube 16 minus the volume of float 19. When liquid rises in the interspace 20 the buoyant force exerted upon float 19 is equal to the weight of the liquid of the volume of the float which is immersed in the fluid. The mechanical advantage obtained will be equal to the volume of the float which is immersed in the liquid divided by the volume of the liquid in the interspace. This is illustrated in Table 1. Thus, when the dimensions of the tube 16 are 201 cm × 201 cm × 100 cm, and the dimensions of the float 19 are 200 cm × 200 cm × 100 cm, the volume of the interspace is about 40.1 liters. If the liquid exerting the buoyant force had a specific gravity of 1, a force of 4,000 Kg would be obtained by 40.1 Kg of water. Thus a mechanical advantage of about a 100 will be obtained. As illustrated in Table 1, the mechanical advantage can be increased by increase in the volume of float-volume of interspace ratio.

The total force exerted by the float 19 can be greatly increased by the utilization of a liquid of high specific gravity. Thus, if mercury were utilized as the buoyancy fluid the buoyant force exerted upon the float would be about 13.5 times larger than the buoyant force exerted by a liquid of a specific gravity of 1. Thus, instead of 4,000 Kg of force, the force exerted by the float will be 54,000 Kg or 54 tons. This can be utilized in the low pressure engine to increase the compactness of the engine as illustrated in FIG. 2 of this disclosure.

A predetermined resistance to the upper movement of float 19 is essential for the development of a significant working force. This is caused by the fact that in the absence of such resistance the float 19 will rise when the buoyant force slightly exceeds the weight of the float. The volume of the float submerged in the liquid will thus remain small. Thus if the weight of the float of the above dimensions were naturally 20 Kg the float will rise when the level of the liquid (of a specific gravity of 1) in interspace 20 has reached 0.5 cm, and the buoyant force will only slightly exceed 20 Kg. In order to develop a larger buoyant force, e.g. 4,000 Kg 100 cm of the float will have to be submerged in the liquid before the float begins to rise.

Table I

| Dimensions of conduit 16 (cm) | Dimensions of body 19 (cm) | Volume of interspace (liter) | Ratio body-interspace | Mechanical advantage |
|---|---|---|---|---|
| 202 × 202 × 100 | 200 × 200 × 100 | 80.4 | 4,000/80.4 | 50 |
| 201 × 201 × 100 | " | 40.1 | 4,000/40.1 | 100 |
| 200.5 × 200.5 × 100 | " | 20.0 | 4,000/20 | 200 |
| 200.1 × 200.1 × 100 | " | 4 | 4,000/4 | 1,000 |

What is claimed is:

1. A low pressure engine comprising a warm chamber, adapted to keep liquid at a relatively warm temperature,
    a cold chamber adapted to keep fluid at a relatively cold temperature,
    a supply of activating fluid in said warm chamber having a liquid level partitioning warm chamber into a vapor chamber portion and a liquid chamber portion,
    a conduit immersed in liquid portion of warm chamber said conduit opening at its other end into cold chamber,
    a body in said conduit defining a relatively small interspace between body and conduit,
    means for allowing the rise of a liquid in said interspace in response to vapor pressure,
    a moving member responding to buoyant force exerted by said rising fluid,
    means for temporary restraining of movement of said moving member until activating fluid has reached a predetermined level in interspace between conduit and body,
    a vapor conducting conduit interconnecting the vapor portions of warm and cold chambers,
    means for cyclic opening and closing said vapor conducting conduit to effect differences in vapor pressure between cold and warm chambers,
    means for obtaining a temperature differential between cold and warm chambers,
    force transmitting means operatively associated with said moving part for translating movements of moving part into useful work,
    and a second high density fluid layer adapted to rise in interspace between body and conduit to increase the buoyant force per unit volume of the body.

2. A low pressure engine comprising a warm chamber, adapted to keep liquid at a relatively warm temperature,
    a cold chamber adapted to keep fluid at a relatively cold temperature,
    a supply of activating fluid in said warm chamber having a liquid level partitioning warm chamber into a vapor chamber portion and a liquid chamber portion,
    a conduit immersed in liquid portion of warm chamber said conduit opening at its other end into cold chamber,
    a body in said conduit defining a relatively small interspace between body and conduit,
    means for allowing the rise of a liquid in said interspace in response to vapor pressure,
    a moving member responding to buoyant force exerted by said rising fluid,
    means for temporary restraining of movement of said moving member until activating fluid has reached a predetermined level in interspace between conduit and body,
    a vapor conducting conduit interconnecting the vapor portions of warm and cold chambers,
    means for cyclic opening and closing said vapor conducting conduit to effect differences in vapor pressure between cold and warm chambers,
    means for obtaining a temperature differential between cold and warm chambers,
    force transmitting means operatively associated with said moving part for translating movements of moving part into useful work,
    and means for submerging the cold chamber in an ambient body of water which is situated at a lower level than the warm chamber,
    and pump means for returning vapor condensate in cold chamber to warm chamber.

* * * * *